United States Patent [19]
Warnick et al.

[11] Patent Number: 5,901,245
[45] Date of Patent: May 4, 1999

[54] METHOD AND SYSTEM FOR DETECTION AND CHARACTERIZATION OF OPEN SPACE IN DIGITAL IMAGES

[75] Inventors: James Warnick, Pittsford; Rajiv Mehrotra, Brighton; Robert A. Senn, Pittsford, all of N.Y.

[73] Assignee: Eastman Kodak Company, Rochester, N.Y.

[21] Appl. No.: 08/786,932

[22] Filed: Jan. 23, 1997

[51] Int. Cl.[6] .............................. G06K 9/46; G06K 9/38
[52] U.S. Cl. ..................... 382/190; 382/172; 382/270
[58] Field of Search ................................. 382/203, 206, 382/162, 165, 172, 173, 190, 199, 254, 270, 271–275; 345/429–431; 348/584, 586, 589; 358/466

[56] References Cited

U.S. PATENT DOCUMENTS

| | | | |
|---|---|---|---|
| 4,855,934 | 8/1989 | Robinson | 364/521 |
| 5,371,810 | 12/1994 | Vaidyanathan | 382/48 |
| 5,493,643 | 2/1996 | Soderberg et al. | 395/162 |
| 5,598,482 | 1/1997 | Balasubramanian | 382/199 |
| 5,697,001 | 12/1997 | Ring et al. | 396/121 |
| 5,710,829 | 1/1998 | Chen et al. | 382/173 |
| 5,757,517 | 5/1998 | Couwenhoven et al. | 358/463 |

OTHER PUBLICATIONS

William K. Pratt, *Digital Image Processing*, Second Edition, by John Wiley & Sons, New York, 1191, pp. 491–556.
Robert M. Haralick and Linda G. Shapiro, *Computer and Robot Vision*, by Addison–Wesley Publishing Co., Reading, Mass., 1992, pp. 453–494.
R. W. G. Hunt, *The Reproduction of Colour in Photography, Printing & Television*, Fourth Edition, Fountain Press, England, 1987, pp. 96–133.
Kenneth R. Castleman, *Digital Image Processing*, Prentice Hall, Englewood Cliffs, New Jersey, 1996, pp. 71–80.
P. K. Sahoo, S. Soltair, A. K. C. Wong, and Y. C. Chen, *A Survey of Threshold Techniques*, Computer Vision, Graphics, and Image Processing, vol. 41, 1988, pp. 233–260.
Rafael C. Gonzales and Richard E. Woods, *Digital Image Processing*, by Addision–Wesley Publishing Company, Reading, Mass., 1992, pp. 40–43.
Ramesh Jain, Rangach Kasturi, and Brian Schunck, *Machine Vision*, by McGraw–Hill, New York, 1995, pp. 97–100.
Rafael C. Gonzales and Richard E. Woods, *Digital Image Processing*, by Addison–Wesley Publishing Company, Reading, Mass., 1992, pp. 518–548.
R. W. G. Hunt, *The Reproduction of Colour in Photography, Printing & Television*, Fountain Press, 4th Edition, England, 1987, pp. 129–132.
R. M. Haralick, et al., *Textural Features for Image Classification*, IEEE Transactions on Systems, Man, and Cybernetics, vol. SMC–3, No. 6, 1973, pp. 610–621.
K. I. Laws, *Textured Image Segmentation*, USCIPI Report No. 940, University of Southern California, Image Processing Institute, Jan., 1980, pp. 127–132.
H. Tamura, et al., *Textural Features Corresponding to Visual Perception*, IEEE Transactions on Systems, Man, and Cybernetics, vol. SMC–8, No. 6, 1978, pp. 460–473.
J. M. Francos, et al., *A Unified Texture Model Based on a 2–D Wold–Like Decomposition*, IEEE Transactions on Signal Processing, vol. 41, No. 8, Aug. 1993, pp. 2665–2678.

*Primary Examiner*—Leo H. Boudreau
*Assistant Examiner*—Bhavesh Mehta
*Attorney, Agent, or Firm*—Peyton C. Watkins

[57] ABSTRACT

A method for detecting open space in a digital image, the method comprises the steps of creating an activity map for permitting determination of the activity of the digital image; determining which pixels in the activity map are below a threshold; and identifying open space as contiguous pixels of the activity map having values below the predetermined threshold.

29 Claims, 9 Drawing Sheets

| $C_K(i-2,j-2)$ | $C_K(i-1,j-2)$ | $C_K(i,j-2)$ | $C_K(i+1,j-2)$ | $C_K(i+2,j-2)$ |
|---|---|---|---|---|
| $C_K(i-2,j-2)$ | $C_K(i-1,j-1)$ | $C_K(i,j-1)$ | $C_K(i+1,j-1)$ | $C_K(i+2,j-1)$ |
| $C_K(i-2,j)$ | $C_K(i-1,j)$ | $C_K(i,j)$ | $C_K(i+1,j)$ | $C_K(i+2,j)$ |
| $C_K(i-2,j+1)$ | $C_K(i-1,j+1)$ | $C_K(i,j+1)$ | $C_K(i+1,j+1)$ | $C_K(i+2,j+1)$ |
| $C_K(i-2,j+2)$ | $C_K(i-1,j+2)$ | $C_K(i,j+2)$ | $C_K(i+1,j+2)$ | $C_K(i+2,j+2)$ |

$(i,j)$ = PIXEL LOCATION
$C_K(i,j)$ = PIXEL VALUE AT LOCATION $(i,j)$

*FIG. 4*

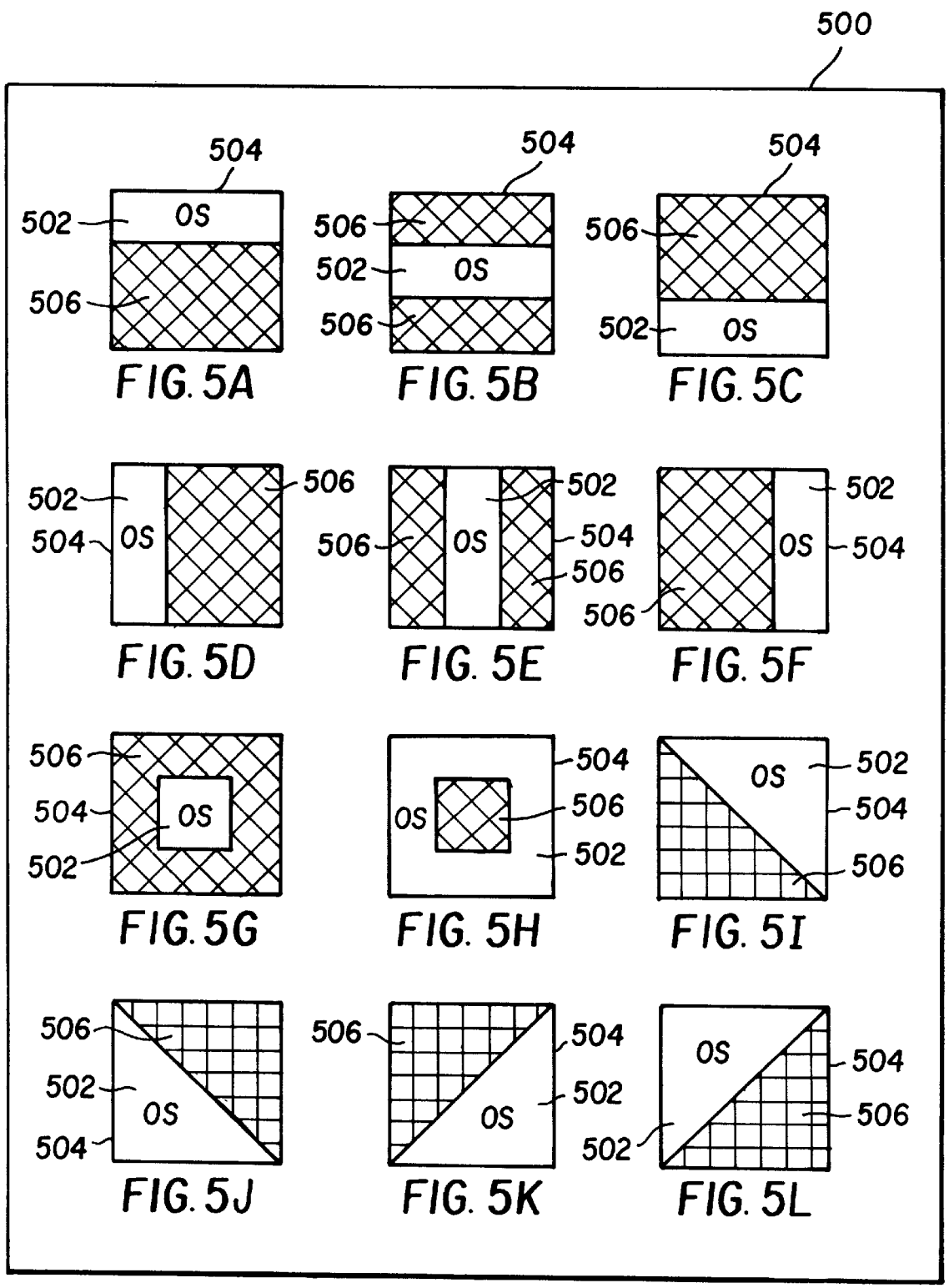

METHOD AND SYSTEM FOR DETECTION AND CHARACTERIZATION OF OPEN SPACE IN DIGITAL IMAGES

FIELD OF THE INVENTION

The invention relates generally to the field of image processing, and in particular to a computer-implemented method and system for detection and characterization of open space in images.

BACKGROUND OF THE RELATED ART

It is often desirable to identify regions within an image which are suitable for the inclusion of text or figurative elements into the image. Such regions are known as open space, or alternatively, copy space, empty space, or dead space. Open space is typically one or more completely bounded sub-regions of an image whose color and spatial properties appear visually uniform. These sub-region boundaries may have either a regular or irregular shape. Images with large regions of regular, low contrast, smooth texture qualities are desirable regions to place such textual or figurative elements. An example use of open space would be in a photographic image used for the cover of a magazine, where the text used for the magazine title and description of feature articles must be placed in areas on the image where there exists a distinct absence of essential subject matter.

Open space can be characterized in terms of the spatial extent of the region, the location of the region relative to the entire image, and the dominant color and texture contained within the open space. Such characterizations are generally referred to as image metadata because such metadata is derived from the image. Specifically, the characterization of the extent, location, color and texture of the open space within an image is referred to as open space metadata.

Presently, the ability to detect and characterize open space in an image is a manual, subjective task which can produce limited results. It is a common practice to examine images with respect to their open space attributes in order to identify the proper image for a particular application. In the example of selecting an appropriate photographic image for the cover of a magazine, many images must be evaluated, not only for their open space attributes but also their content as appropriate for the magazine. A search of a very large image collection for images which meet the specific open space requirement, such as red regions across the upper 20% of the entire image, will produce only a limited number of candidate images from the collection due to the extensive, time consuming manual search required. Every image in the collection must be visually examined, even if it contains no open space whatsoever. Additionally, this entire process must be repeated for every open space search request.

The results of a manual search for images containing open space will be subjective, relying on the searcher's own mental concept of open space as it relates to the open space requirements set forth in the search request. The person requesting an image containing open space is not necessarily the person performing the search on the image collection. These two people may not share the same concept of open space as set forth in the search request, causing a mis-match in the open space search results. Additionally, each candidate image identified by manual inspection is equally weighted, with no quantitative ranking from best match of the search requirements to the worst match. These shortcomings may cause the search to produce results that may not identify adequate candidate images from the image collection even though they actually exist in the collection.

Ideally, all images in the collection that meet a set of non-subjective open space criteria should be retrieved and presented to the user for review is some prescribed, non-subjective manner.

Therefore, there is a need for a method and system for objectively identifying and consistently characterizing the open space in images that avoids these problems.

SUMMARY OF THE INVENTION

The present invention is directed to overcoming the problems set forth above. There is provided herein a computer-implemented method and system for detecting and characterizing the open space in an image. According to a preferred embodiment of the invention, one aspect of the invention resides in a method for detecting open space in a digital image, comprising the steps of: (a) creating an activity map for permitting determination of the activity of the digital image; (b) determining which pixels in the activity map are below a threshold; and (c) identifying open space as contiguous pixels of the activity map having values below the predetermined threshold.

It is accordingly an object of this invention to overcome the above described shortcomings and drawbacks of the prior art.

It is still another object to provide a computer-implemented method and system for objectively identifying and characterizing the open space in images contained in collections of images.

Further objects and advantages of this invention will become apparent from the detailed description of a preferred embodiment which follows.

These and other aspects, objects, features, and advantages of the present invention will become more fully understood and appreciated from a review of the following description of the preferred embodiments and appended claims, and by reference to the accompanying drawings.

BRIEF DESCRIPTION OF THE DRAWINGS

FIG. 4 is a diagram illustrating the region of pixels which are used in determining image activity in a portion a digital image;

FIGS. 5A–5L are diagrams illustrating a possible set of open space templates;

To facilitate understanding, identical reference numerals have been used, where possible, to designate identical elements that are common to the figures.

DESCRIPTION OF THE PREFERRED EMBODIMENT

As used herein, computer readable storage medium may comprise, for example; magnetic storage media such as magnetic disk (such as floppy disk) or magnetic tape; optical storage media such as optical disc, optical tape, or machine readable bar code; solid state electronic storage devices such as random access memory (RAM), or read only memory (ROM); or any other physical device or medium employed to store a computer program.

Open space as used herein is defined as one or more completely bounded sub-regions of an image whose color and spatial properties appear visually uniform.

Figure 1:
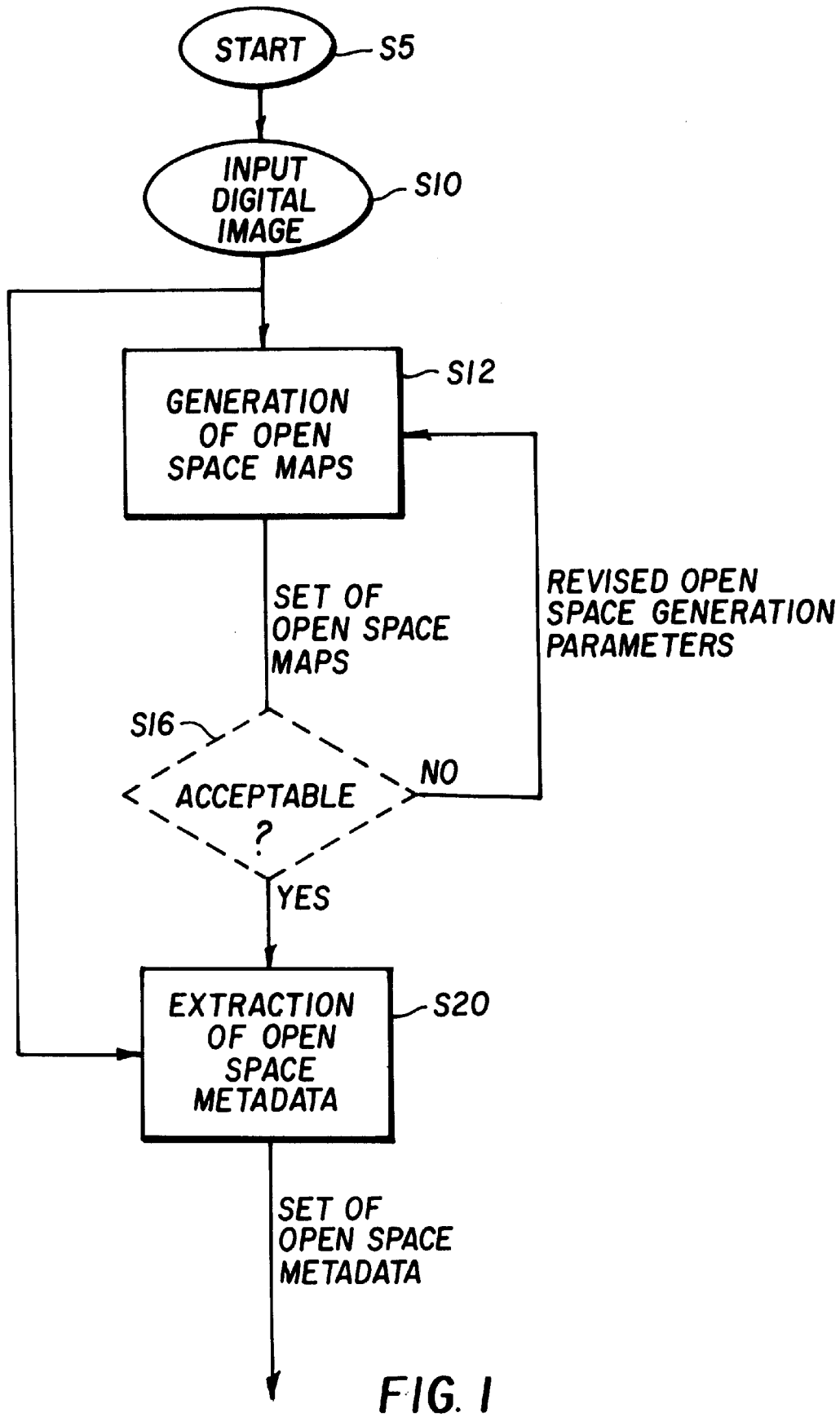
FIG. 1 is a flowchart of a computer-implemented method for generating open space metadata, or characterizing the open space, from an image, according to a preferred embodiment of the present invention.

Referring to FIG. 1, there is shown a flowchart of a software program for the detection and characterization of open space in images which is typically implemented on a computer system (not shown). The software program is initiated S5 and a digital image is input S10 into the computer system by any well known method. Those skilled in the art will appreciated that the digital image may be provided directly from a digital source, such as a digital electronic camera or graphic arts application on a computer, or may be produced from a photograph or art work by scanning. Additionally, it will be appreciated by those skilled in the art that the digital image can be a single still image, or a single frame of a motion picture sequence or video sequence. Alternatively, multiple still images, multiple frames from a motion picture sequence or video sequence can be processed as a sequence of still images without departing from the scope of the invention.

A set of binary-valued images, generally referred to as an open space maps, which identifies any open space regions contained within the input digital image is generated S12, as will be described in detail hereinafter. Optionally, the set of open space maps can be reviewed S16 for acceptability, as described in the following paragraph.

The open space review process S16 can be performed by visual inspection of the set of open space maps or by an automated function where the set of open space maps are compared to preset standards, such as a minimum size or contiguousness requirements. If the set of open space maps is unacceptable, the open space review process S16 permits the open space generation parameters to be revised and the generation S12 of the set of open space maps can be re-executed. If the set of open space maps is acceptable, a set of open space metadata is extracted S20 using the digital image along with the set of open space maps; a more detailed description of the generation and extraction steps is given below.

Detection of Open Space

Figure 2:
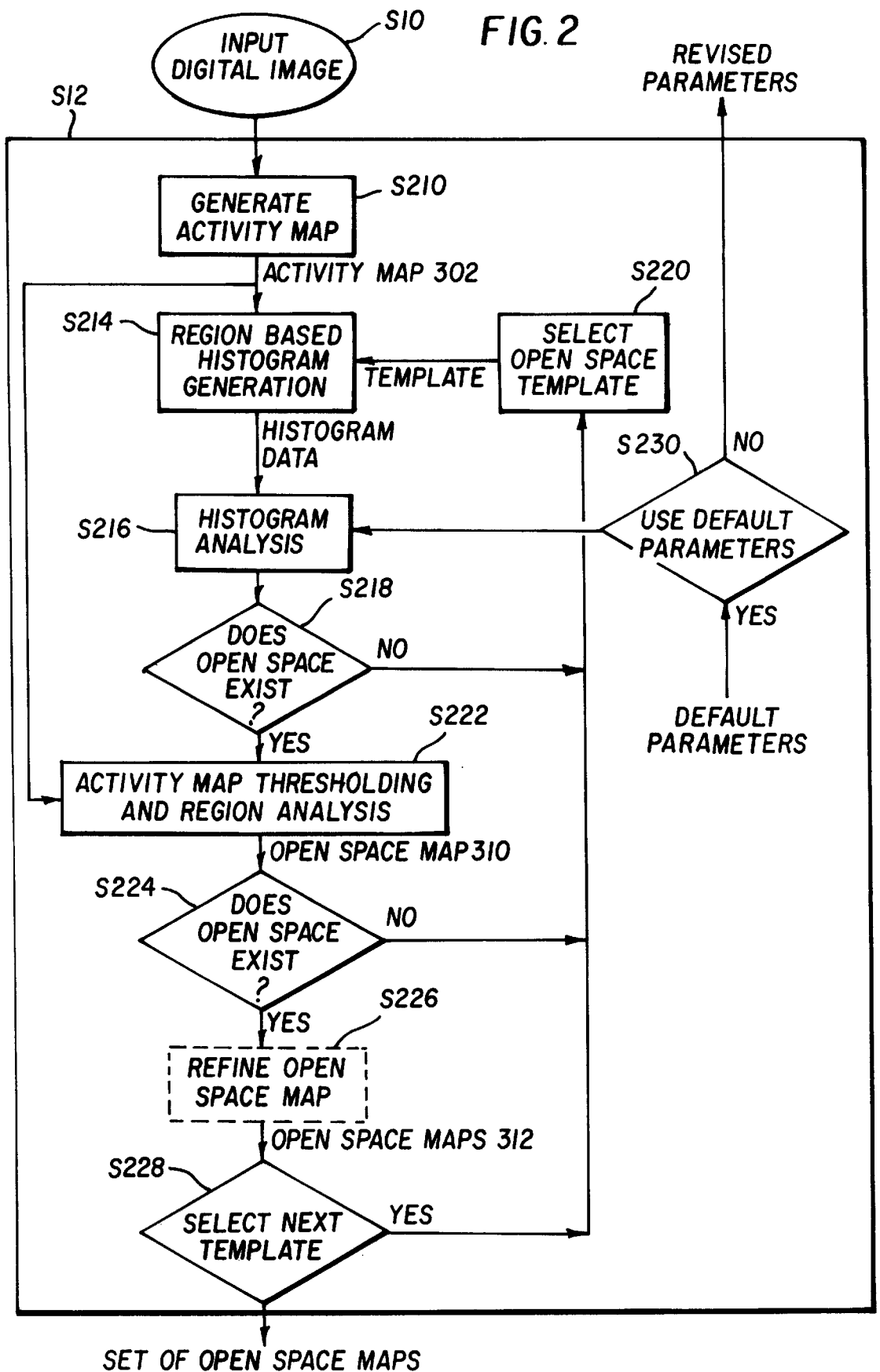
FIG. 2 is a detailed flowchart of the portion of the flowchart of FIG. 1 which detects the presence of open space.
Figure 3A:
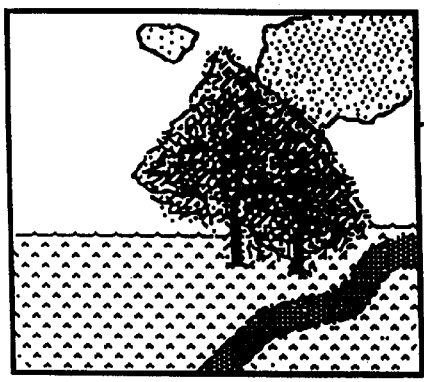
FIGS. 3A–3D are diagrams illustrating the process of going from a digital image to an open space map.
Figure 3B:
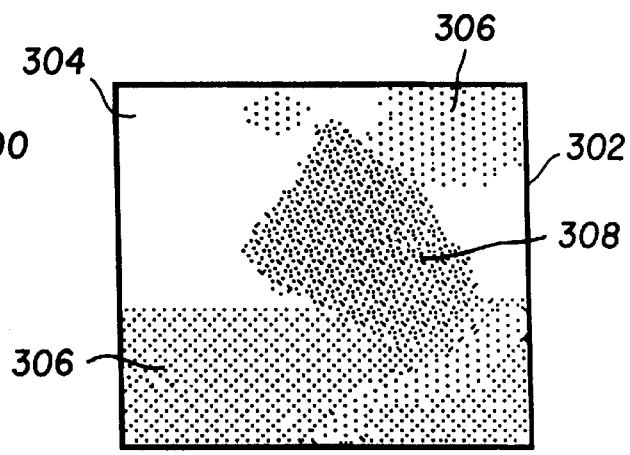
Figure 3C:
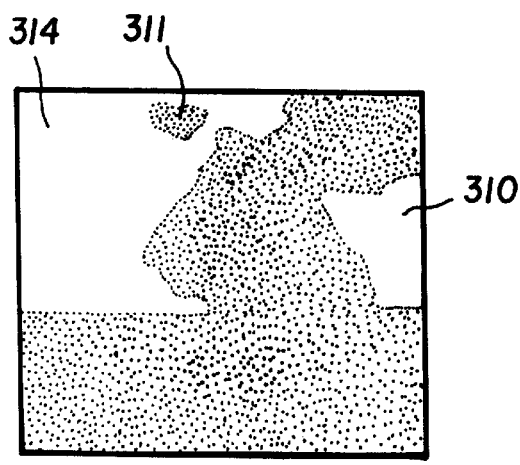
Figure 3D:
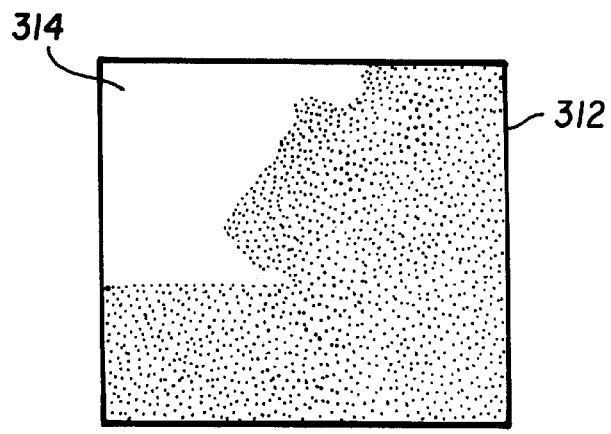

Referring to FIGS. 2 and 3, a detailed flowchart for the generation S12 of open space maps is illustrated in FIG. 2 and corresponding images generated from the flowchart are illustrated in FIG. 3. It is instructive to note that open space in an image is characterized by a lack of activity in a contiguous region of the image, and such open space regions are relatively smooth with low pixel-to-pixel contrast. In order to detect such regions in an image, the digital image 300 is processed S210 to generate an activity map image 302. This activity map 302 identifies the spatial distribution of activity, or homogeneity, in the digital image. More specifically, the activity map image 302 is generated S210 by measuring the activity/smoothness/homogeneity within the digital image 300 using any known method, such as edge detection, local entropy measurement, or local texture analysis. For example, edge detection techniques produce an activity map 302 whose pixel values are a measure of the image local edge content. Edge detection techniques such as a gradient detector, a Canny edge detector, or a convolution process using a Sobel or Prewitt edge kernel are commonly used for edge detection. (See William K. Pratt, *Digital Image Processing*, 2nd Edition, John Wiley & Sons, New York, 1991, pp. 491–556). The larger the pixel value in the output edge-detected image, the greater the edge content, or activity, in the image. Alternatively, in a local entropy method, a moving window passed across the image which measures the variance or entropy of the histogram of the pixels contained within the window produces an activity map 302 whose pixel values are proportional to the local image activity. (See William K. Pratt, *Digital Image Processing*, 2nd Edition, John Wiley & Sons, New York, 1991, pp. 559–567) Likewise, a local texture analysis can produce an activity map 302 whose pixel values are proportional to the local image texture, or activity, within the image (See Robert M. Haralick and Linda G. Shapiro, *Computer and Robot Vision*, Addison-Wesley Publishing Co., Reading, Mass., 1992, pp. 453–494). With any of these methods, open space regions, which are relatively texturally smooth and of relatively low local contrast 304, will produce low valued pixels in the activity map 302 while non-open spaces will produce medium valued pixels 306 or high valued pixels 308 in the activity map 302. Those skilled in the art will recognize that other image activity measures can be employed without departing from the scope of the invention. Additionally, the method and system described herein can be extended to detect and characterize regions of uniform texture by the appropriate texturebased activity measures.

In the preferred embodiment, the activity map 302 is preferably generated S210 using a local color/luminance difference method, as described hereinafter. Referring to FIG. 4, an activity value $A_K(i,j)$ associated with pixel (i,j) in the digital image 300 is computed as the maximum of the absolute value of the difference between the pixel value $c_K(i,j)$ and its neighboring pixel values. For example, the activity value $A_K(i,j)$ can be computed from a 5×5 window centered on the pixel located at location (i,j), where $A_K(i,j)$ is expressed as the maximum of the absolute value of the difference between the pixel value $c_K(i,j)$ and its twenty four neighbor pixel values, or $$A_K(i,j) = \text{MAX}[|c_K(i,j) - c_K(x,y)|]$$

where x=i−2, i−1, i, i+1, i+2
and y=j−2, j−1, j, j+1, j+2
$c_K(i,j)$ denotes the k-th color band pixel value at location (i,j) in the digital image 300. In the case of a digital image 300 with a plurality of color bands, the overall activity value A(i,j) associated with the pixel located at (i,j) is the maximum activity value for each of the color bands at the pixel location as given by $$A(i,j) = \text{MAX}[A_K(i,j)], k=1, \ldots, N,$$

where N is the number of color bands.
Alternatively, the activity value A(i,j) can be coupled in a multi-band color space by:

$$A(i,j) = \text{MAX}[\text{dist}(C(i,j) - C(x,y))]$$

where C(i,j) is the multi-band pixel value at location (i,j), C(x,y) is the multi-band pixel value at location (x,y), and dist is any known distance measure such as Euclidean distance.

The overall activity value A(i,j) is low in image regions where the color/luminance value of a pixel and its neighbors is smooth and homogeneous. In regions which are not smooth and homogeneous, the activity value A(i,j) is high. It will be obvious to those skilled in the art that the activity value A(i,j) can be computed from image pixel values expressed in any known 0. 0-band color space, such as RGB, YCC, L*a*b*, IHS (see R. W. G. Hunt, *The Reproduction of Colour in Photography, Printing & Television*, Fourth Edition, Fountain Press, England, 1987, pp. 96–133), or from pixel values from the single band of luminance components, while not deviating from the scope of the invention. Additionally, the digital image 300 can be preprocessed to remove noise in the image by any of the known noise removal methods prior to or during the generation of the activity map 302.

The activity map 302 is the basis for determining if open space exists within any region of the digital image 300. Referring briefly to FIG. 5, a set of open space templates 500 are used in conjunction with the activity map 302 to determine the presence of open space present within the digital image 300. Each open space template 504 defines a small search region 502 in the corresponding portion of the activity map 302 which is used to establish the presence of open space in that region. A possible set of open space templates 500 is shown in FIG. 5 where the template 504 shown in FIG. 5(a) is used to detect open space in the top of the image, (b) is used to detect open space in the horizontal center of the image, (c) the bottom of the image, and etc as is readily apparent. Each template 504 defines an open space type, such as top open space, middle open space, bottom open space, and etc. The set of templates 500 can vary depending upon the specific application. Those skilled in the art will recognize that other open space types and templates can be employed without deviating from the scope of the invention. Each template 504 in the set of open space templates 500 will be used individually to determine the presence of open space in the defined search region 502 using the method described hereinafter.

A histogram of activity map values within the search region 502 is computed S214 to determine if open space of the type defined by the template 504 exists in the digital image 300. Additionally, this histogram will be used to establish a threshold value T which will be used to generate an open space map 312 from the activity map 302 for the particular open space type. Referring to FIG. 6, the histogram computed from a search region 502 will correspond to one of the following three cases.

Figure 6A:
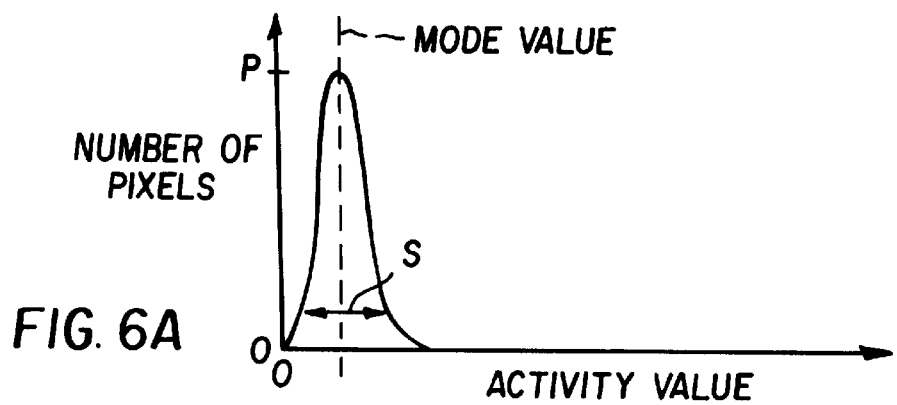
FIGS. 6A–6C are diagrams illustrating typical histograms derived from the activity map image.

In case 1, the entire search region 502 corresponds to open space and produces the histogram shown in FIG. 6(a) since activity values A(i,j) in open space regions are low. The histogram is predominantly unimodal and contains low activity values with a high peak value P and a small spread S of values.

Figure 6B:
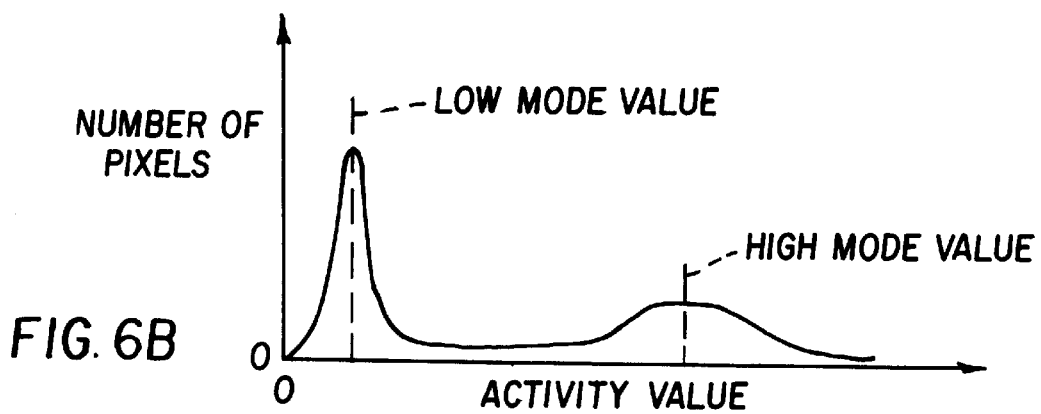

In case 2, the majority of the search region 502 is open space and produces the histogram shown in FIG. 6(b). The histogram is bimodal with the lower activity value mode representing the activity values A(i,j) associated with the open space in the template region. The other mode, which has a higher activity value, represents the non-open space in the template region.

Figure 6C:
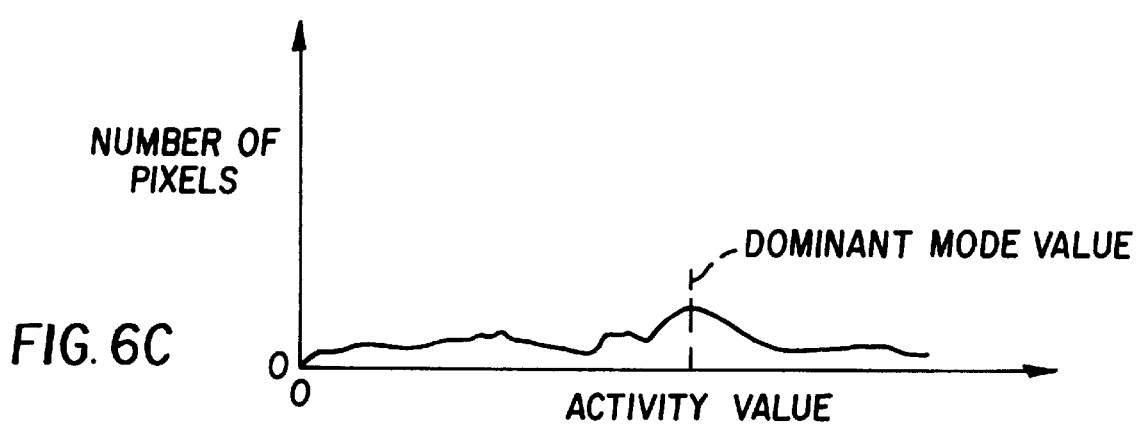

In case 3, the majority of the search region 502 is non-open space and produces the histogram shown in FIG. 6(c). The histogram can be unimodal with low peak and large spread values, bimodal, multimodal, or nearly uniformly distributed. When the entire search region 502 contains non-open space, the dominant modes in the histogram occur at large activity values.

Figure 7A:
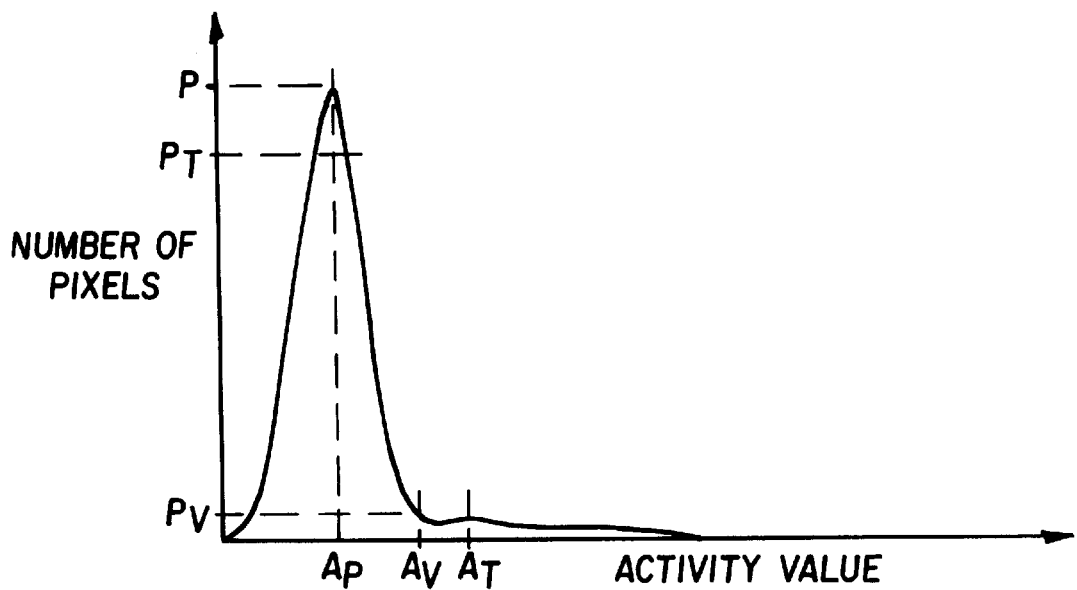
FIGS. 7A–7B are diagrams illustrating typical histogram analysis threshold values.

Based upon the histogram characteristics for the three cases presented above, the following histogram modality analysis S216 is used to automatically estimate an activity threshold value T. The threshold value T permits pixels in the activity map 302 which are below Gower than) the threshold value T to be identified as open space pixels. Similarly, pixels in the activity map 302 which are above (higher than) the threshold value T are identified as non-open space pixels. Referring to FIG. 7(a), let $A_P$ be the activity value where the first histogram maxima occurs. For open space to be present in the search region 502, the first histogram mode must have an activity value $A_P$ that is low and a peak value P that is relatively high, exhibiting a Gaussian-like shape with a small spread value.

Figure 7B:
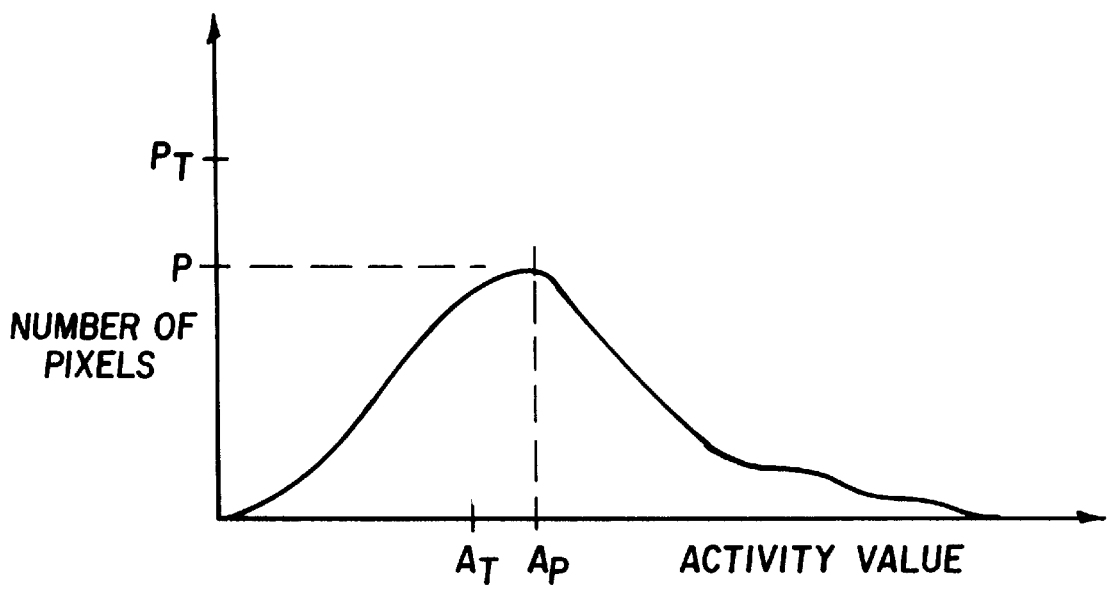

Referring to FIG. 7(b), $A_T$ is the maximum permissible activity value and $P_T$ is the minimum mode peak value for open space pixels. If the histogram modal value $A_P$ is greater than the value $A_T$, or if the modal peak value P is less than $P_T$, then no significant open space will be present in the search region 502 as the first histogram mode will not be composed of low activity pixel values. For this occurrence, the next template 504 is selected S220 from the set of open space templates 500 and the histogram generation S214 and analysis S216 processes are repeated.

If the value of $A_P$ is less than $A_T$ and has a peak value greater than $P_T$, then open space will be present in the search region and a histogram modality analysis is employed to find the value of threshold T such that all activity values less than T will fall only within the first histogram mode. In the preferred embodiment of the invention, the value of threshold T is determined by the following method:

(a) Referring again to FIG. 7(a), compute the histogram peak value P for the first histogram mode and the activity value $A_P$ associated with the peak value P, (b) compute the first activity value $A_V$ which is greater than $A_P$ which has an average histogram value of $P_V$ over a window of size 5, where $P_V$ has a value of 2% of the value of P, (c) compute the modal slope MS as $MS=(P-P_V)/(A_P-A_V)$ (d) If MS is equal to or greater than the value of P/15, then set $T=A_V$, (e) If MS is less than the value of P/15, no significant open space is contained within the search region 502 and the next template 504 is selected S220 from the set of open space templates 500 and the histogram generation S214 and analysis. S216 processes are repeated.

Alternatively, a Gaussian shape can be fitted to the histogram mode data and the activity value that corresponds to 95% of the Gaussian shape area can be computed and selected as the threshold value T. Other known histogram analysis methods can be employed to establish the value of threshold T without departing from the scope of the invention (see K. R. Castleman, *Digital Image Processing*, Prentice Hall, Englewood Cliffs, N.J., 1996, pp. 71–80 and P. K. Sahoo, S. Soltari, A. K. C. Wong, and Y. C. Chen, A Survey of Thresholding Techniques, *Computer Vision, Graphics, and Image Processing*, Vol. 41, 1988, pp. 233–260).

The values for $A_T$ and $P_T$ can be determined empirically. In the preferred embodiment of the invention, the activity value for $A_T$ is 10 and $P_T$ is 15% of the number of histogram pixels in the search regions, both values computed from 8 bit luminance imagery. The values for $A_T$ and $P_T$ become the default parameters used in the histogram analysis S216. The default parameters can be replaced S230 with revised parameters if necessary to detect the presence of open space in other than 8 bit luminance imagery.

Alternatively, the threshold value T can be predetermined for the type of imagery to be processed and set as a default parameter, in which case the histogram modality analysis S216 is unused.

Referring again to FIGS. 3A–3D, the threshold value T as determined hereinbefore is used in a thresholding operation S222 performed on the entire activity map image 302, producing a preliminary open space map 310 having either one of two values, typically 0 and 1. All activity map 302 pixel values less than the threshold value T are set to the value 1 to indicate open space in the activity map 302, while all values greater than the threshold value T are set to 0 to indicate non-open space in the preliminary open space 310.

The search region 502 of the preliminary open space map 310 is examined to determine the largest connected component segment (See Rafael C. Gonzales and Richard E. Woods, *Digital Image Processing*, Addison-Wesley Publishing Company, Reading Massachusetts, 1992, pp. 40–43 for discussion of connected component analysis). If this largest connected component segment has an area that is less than a minimum value R, then no significant open space has been identified within the search region for this open space type and the next template 504 is selected S220 from the set of open space templates 500 and the histogram generation S214 and analysis S216 processes are repeated. However, if the connected component has an area that is equal to or greater than minimum value R, a region growing process is employed to grow the connected component segment into the non-template area 506 of the image to produce the final open space map (See Ramesh Jain, Rangachar Kasturi, and Brian Schunck, *Machine Vision*, McGraw-Hill, N.Y., 1995, pp. 97–100 for a discussion of region growing methods). The value of the threshold R is user selectable. In the preferred embodiment, R is set to 75% of the search region area.

As an option, the open space map 310 can be further processed S226 to remove small, isolated non-open space regions 311 which are completely embedded with the open space region. Similarly, small isolated open space regions 313 which are completely embedded with the non-open space region can be removed if so desired. Any of the known methods, such as minimum size analysis or morphological filtering, can be employed for this process (See Rafael C. Gonzales and Richard E. Woods, *Digital Image Processing*, Addison-Wesley Publishing Company, Reading Massachusetts, 1992, pp. 518–548).

The hereinbefore described process of detecting S12 open space is performed S228 for each template 504 in the set of open space templates 500, thus produced a set of open space maps. The set of open space maps can optionally be reviewed S16 for acceptability, as hereinbefore described, and re-generated S12 as necessary. Each open space map 312 in the set of open space maps is used in conjunction with the digital image 300 to characterize S20 the open space identified in each open space map 312 as described hereinafter.

Characterizing Open Space

Figure 8:
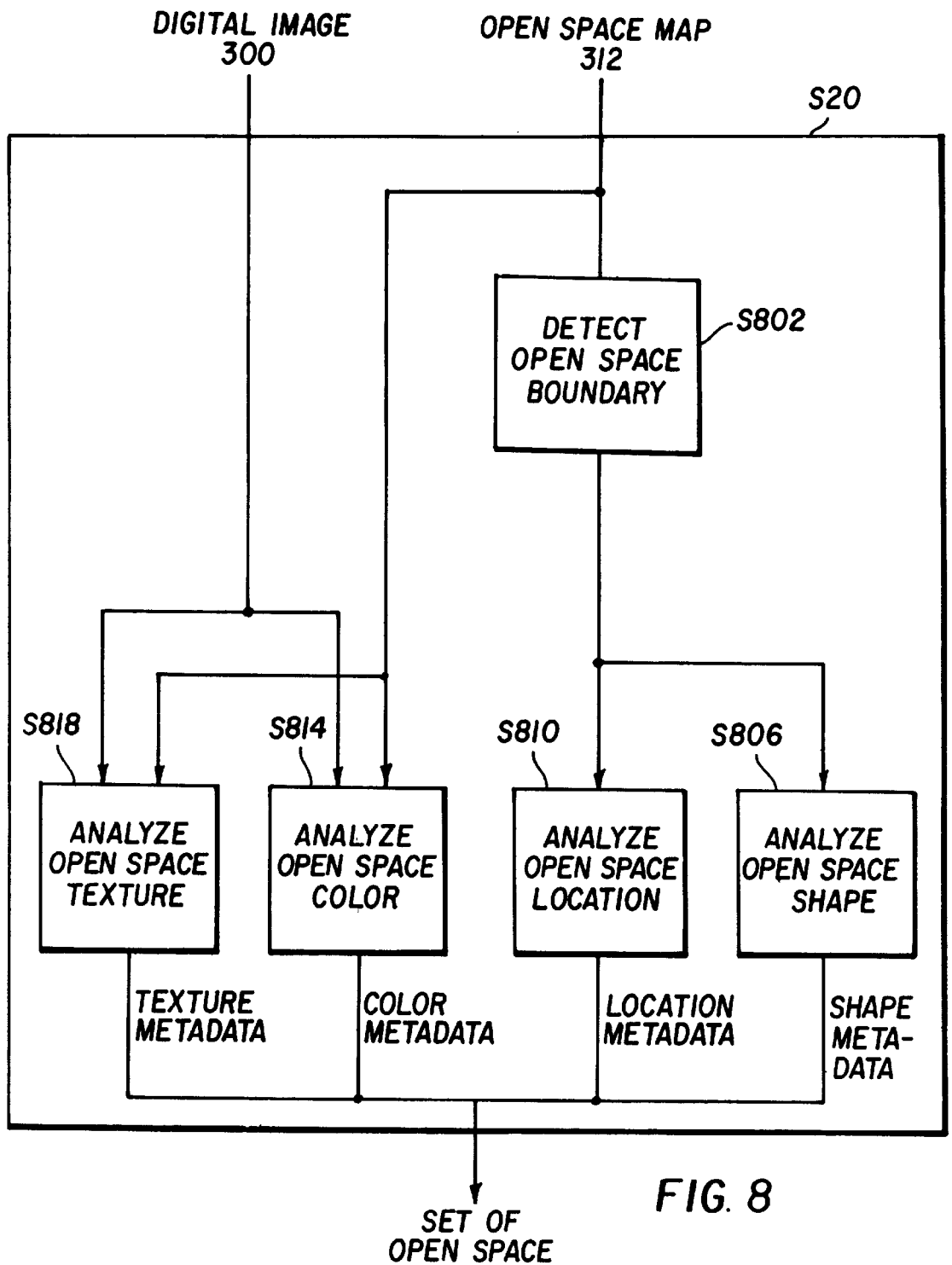
FIG. 8 is a detailed flowchart of the portion of the flowchart of FIG. 1 which characterizes the open space.
Figure 9A:
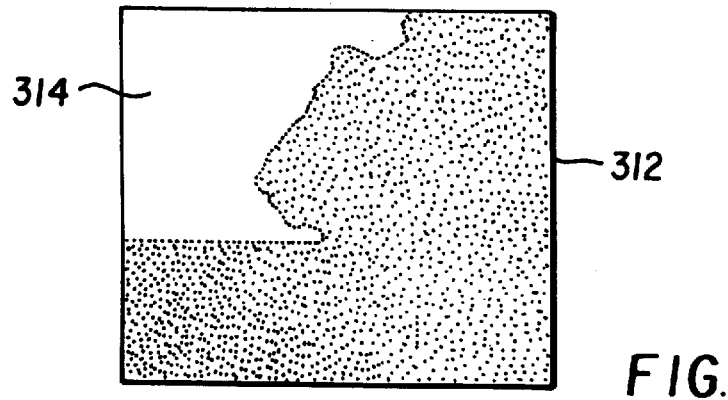
FIGS. 9A–9C are diagrams illustrating geometric shapes fitted to open space regions.
Figure 9B:
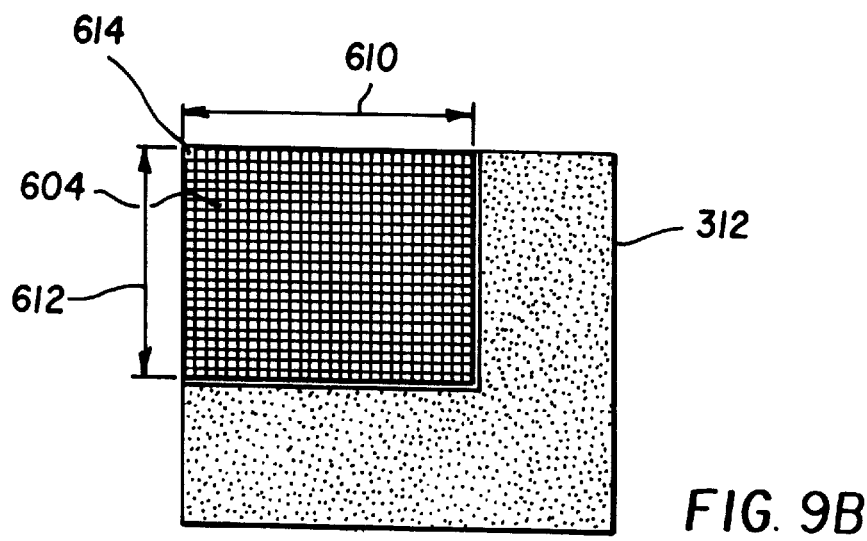
Figure 9C:
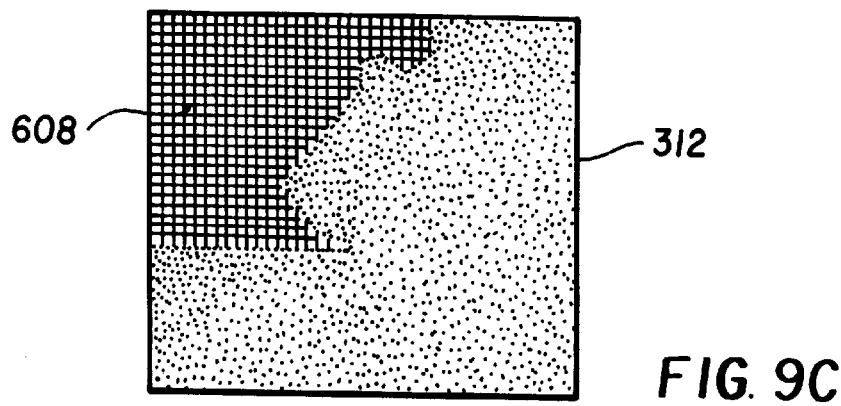

It is instructive to note that open space can be characterized S20 by its shape, location, color, and texture, although other characteristics may be used such as characterizing the percentage of open space within image regions. The detected open space shape can be determined from the its boundary as identified in the open space map, 312. Referring to FIGS. 8 and 9, the boundary of the detected open space is detected and extracted S802 from the open space map 312. In the preferred embodiment of the invention, the smallest geometric shape 604 which completely encloses the detected open space 314 as identified in the open space map 312 is computed S802. This geometric shape 604 is preferably a rectangle for those open space types which are fundamentally rectangular (e.g. FIG. 5($a$)–($h$)) and a right triangle for those open space types which are fundamentally triangular (e.g. FIG. 5($i$)–($l$)). Other geometric shapes 608, such polygons, can be employed when other open space types are used. The smallest shape is defined as the shape with the minimum area that completely encloses the detected open space 314 defined in the open space map 312. The perimeter defined by the smallest geometric shape forms the bounds of the detected open space 314 in the image.

The characterization of the detected open space shape S806 is based on the geometric shape selected. For rectangular shapes 604, the length of the major 610 and minor 612 sides of the smallest rectangle shape that completely encloses the open space 314 and the geometric type (rectangular) are selected as the open space shape metadata. Similarly, for triangular shapes, the length of the two non-hypotenuse sides of the smallest right angle triangle that completely encloses the open space and the geometric type (triangular) are selected as the open space shape metadata. Alternatively, the area defined by the geometric shape can be extracted and included in the open space shape metadata. This area can be represented by either the total number of pixels within the geometric shape or the percent of the total image area occupied by the geometric shape.

The location of the detected open space is then determined S810 by locating one predetermined corner of the geometric shape selected used to determine the open space shape. It is instructive to note that by knowing the location of one corner and the dimensions of the geometric shape, the exact bounds of the detected open space can be defined. For example, in rectangular shapes, the predetermined corner is the upper left corner 614 of the geometric shape. The x,y location of this corner is selected as the open space location metadata which is used in conjunction with the open space shape metadata defined above to completely define the spatial extent of the detected open space 314 in the digital image 300. Similarly, for triangular structures, the location (x,y) of the right angle corner of the structure can be selected as the open space location metadata. Alternatively, other location identifiers such as the location of the geometric shape centroid can be selected as the open space location metadata.

Those skilled in the art will recognize that, when other geometric shapes are selected to define the bounds of the open space in the image, additional shape and location descriptors can be selected as the open space shape and location metadata. For example, a polygon can be used to define the bounds of the detected open space. The open space shape and location metadata could then be composed of the location of the polygon vertices and the lengths of the sides of the polygon.

The region of the digital image 302 which corresponds to the detected open space 314 identified in the open space map 312 is analyzed S814 to determine the color characteristics of the detected open space. Multiple color parameters can be quantified, such as the dominant color contained within the open space area or the range of colors within the open space area. These color characteristics can be quantified in any of the known color spaces, such as RGB, YCC, L*a*b*, or IHS. Alternatively, the color characteristics of the open space region can be expressed in terms of its color name (see R. W. G. Hunt, *The Reproduction of Colour in Photography, Printing & Television*, Fountain Press, 4th Edition, England, 1987, pp. 129–132). In the preferred embodiment of the invention, all color characteristics are quantified in RGB color space. Those skilled in the art will appreciate that other color representations can be employed without departing from the scope of the invention.

In the preferred embodiment of the invention, the open space color characteristics quantified are the dominant color and the average color. The dominant color is defined as the modal RGB value of the pixels contained within the detected open space 314 and the average color is defined as the average RGB value of the pixels contained within the detected open space 314. This modal value can be obtained by an analysis of the color histogram computed from the image pixels contained within the bounds of the open space as determine above.

The region of the digital image 302 which corresponds to the open space 314 identified in the open space map 312 is analyzed S818 to determine the texture characteristics of the detected open space. Multiple open space texture parameters can be quantified using any of the known techniques, such as Concurrence Texture Features (see R. M. Haralick, et al, "Textural Features for Image Classification", IEEE Transactions on Systems, Man, and Cybernetics, Vol. SMC-3, No. 6, 1973, pp. 610–621), Laws Texture Features (see K. I. Laws, "Textured Image Segmentation", USCIPI Report No. 940, University of Southern California, Inage Processing Institute, January, 1980), or Tamura Texture Features (see H. Tamura, et al, "Textural Features Corresponding to Visual Perception", IEEE Transactions on Systems, Man, and Cybernetics, Vol. SMC-8, No. 6, 1978, pp. 460–473). Those skilled in the art will appreciate that other texture representations can be employed without departing from the scope of the invention.

In the preferred embodiment of the invention, three 2-D Wold-like texture features (see J. M. Francos, et al, "A Unified Texture Model Based on a 2-D Wold-like Decomposition", IEEE Transactions on Signal Processing, Vol. 41, No. 8, August, 1993) are extracted from the detected open space regions 314. The values computed for the three Wold-like texture features of periodicity, directionality, and randomness, are selected as the open space texture metadata.

In summary, the hereinabove method generates a set of open space maps from a digital image. Each individual open space map in the set of open space maps identifies an open space region within the digital image which is characterized as to its type, shape, location, color and texture. These characterizations are defined as the open space metadata associated with the open space detected within the digital image.

The invention has been described with reference to a preferred embodiment. However, it will be appreciated that variations and modifications can be effected by a person of ordinary skill in the art without departing from the scope of the invention.

Parts List
300 digital image
302 activity map
304 contrast
306 medium valued pixels
308 high valued pixels
310 open space map
311 non-open space regions
312 open space map
313 open space regions
314 detected open space
500 set of open space templates
502 search region
504 open space template
506 non-template area
604 rectangular geometric shape
608 geometric shapes
610 major side
612 minor side
614 upper left corner

What is claimed:

1. A method for automatically detecting an open space region in a digital image, comprising the steps of:
   (a) creating a corresponding activity map from the digital image for permitting determination of the activity of the digital image;
   (b) analyzing the activity map to determine an activity threshold value;
   (c) determining which pixels in the activity map are below the activity threshold value; and
   (d) analyzing the threshold activity map for identifying contiguous pixel regions of the activity map having values below the activity threshold corresponding to open space regions in the digital image.

2. The method as in claim 1, wherein the step of analyzing the activity map to determine an activity threshold value includes analyzing the activity map to determine an image dependent threshold.

3. The method as in claim 2, wherein the step of creating the activity map is created by using either edge detection, local entropy measurement, local texture analysis, local color/luminance difrence analysis.

4. The method as in claim 2, wherein the step of creating the activity map includes determining an activity value at a pixel which activity value is computed as a maximum absolute difference between a value of a predetermined pixel and its neighboring pixel values in the digital image.

5. The method of claim 2, wherein the image dependent threshold is determined by an analysis of a histogram of the activity map histogram.

6. A method for automatically characterizing an open space region in a digital image, comprising the steps of
   (a) creating a corresponding activity map from the digital image for permitting determination of the activity of the digital image:
   (b) analyzing the activity map to determine an activity threshold value;
   (c) determining which pixels in the activity map are below the activity threshold value;
   (d) analyzing the threshold activity map for identifying contiguous pixel regions of the activity map having values below the activity threshold corresponding to open space regions in the digital image;
   (e) extracting image metadata associated with the open space region.

7. The method as in claim 6, wherein step (e) includes identifying individually or any combination of either a shape of the open space, location of the open space in the digital image, color of the open space, or texture of the open space as the metadata.

8. The method as in claim 7, wherein determining the threshold includes analyzing the activity map to determine an image dependent threshold.

9. A system for automatically detecting an open space region in a digital image, the system comprising:
   (a) means for creating a corresponding activity map from the digital image for permitting determination of the activity of the digital image;
   (b) means for analyzing the activity map to determine an activity threshold value;

(c) means for determining which pixels in the activity map are below the activity threshold value; and (d) means for analyzing the threshold activity map for identifying contiguous regions of the activity map having values below the activity threshold corresponding to open space regions in the digital image.

10. The system as in claim 9, wherein said means for determining the pixels below the threshold includes analyzing the activity map to determine an image dependent threshold.

11. The system as in claim 10, wherein said means for creating the activity map uses either edge detection, local entropy measurement, local texture analysis, local color/luminance difference analysis.

12. The system as in claim 10, wherein said means for creating the activity map includes determining an activity value at a pixel which activity value is computed as a maximum absolute difference between a value of a predetermined pixel and its neighboring pixel values in the digital image.

13. The system of claim 10, wherein means for determining the image dependent threshold is determined by analyzing a histogram of the activity map.

14. A computer program product for automatically detecting an open space region in a digital image, comprising: a computer readable storage medium having a computer program stored thereon for performing the steps of:

(a) creating a corresponding activity map from the digital image for permitting determination of the activity of the digital image;

(b) analyzing the activity map to determine an activity threshold value;

(c) determining which pixels in the activity map are below the activity threshold value; and (d) analyzing the threshold activity map for identifying contiguous regions of the activity map having values below the activity threshold corresponding to open space regions in the digital image.

15. The computer program product as in claim 14, wherein the step of analyzing the activity map to determine an activity threshold value includes analyzing the activity map to determine an image dependent threshold.

16. The computer program product as in claim 15, wherein the step of creating the activity map is created by using either edge detection, local entropy measurement, local texture analysis, local color/luminance difference analysis.

17. The computer program product as in claim 15, wherein the step of creating the activity map includes determining an activity value at a pixel which activity value is computed as a maximum absolute difference between a value of a predetermined pixel and its neighboring pixel values in the digital image.

18. The computer program product as in claim 15, wherein the image dependent threshold is determined by analyzing a histogram of the activity map.

19. A system for automatically characterizing an open space region in a digital image, the system comprising:

(a) creating a corresponding activity map from the digital image for permitting determination of the activity of the digital image;

(b) analyzing the activity map to determine an activity threshold value;

(c) determining which pixels in the activity map are below the activity threshold value;

(d) analyzing the threshold activity map for identifying contiguous pixel regions of the activity map having values below the activity threshold corresponding to open space regions in the digital image; and (e) means for extracting metadata associated with the open space region.

20. The system as in claim 19, wherein extracting metadata means includes means for identifying individually or any combination of a shape of the open space, a location of the open space in the digital image, a color of the open space, or a texture of the open space as the metadata.

21. The system as in claim 20, wherein means for determining the threshold includes means for analyzing the activity map to determine an image dependent threshold.

22. A computer program product for automatically characterizing an open space region in a digital image, comprising: a computer readable storage medium having a computer program stored thereon for performing the steps of:

(a) creating a corresponding activity map from the digital image for permitting determination of the activity of the digital image;

(b) analyzing the activity map to determine an activity threshold value;

(c) determining which pixels in the activity map are below the activity threshold value;

(d) analyzing the threshold activity map for identifying contiguous pixel regions of the activity map having values below the activity threshold corresponding to open space regions in the digital image; and (e) extracting metadata associated with the open space region.

23. The computer program product as in claim 22, wherein step (e) includes identifying individually or any combination of a shape of the open space, a location of the open space in the digital image, a color of the open space, or a texture of the open space as the metadata.

24. The computer program product as in claim 23, wherein means for determining the threshold includes means for analyzing the activity map to determine an image dependent threshold.

25. A digital capture device comprising:

(a) means for creating a corresponding activity map from the digital image for permitting determination of the activity of the digital image;

(b) means for analyzing the activity map to determine an activity threshold value;

(c) means for determining which pixels in the activity map are below the activity threshold value; and (d) means for analyzing the threshold activity map for identifying contiguous pixel regions of the activity map having values below the activity threshold corresponding to open space regions in the digital image.

26. The digital capture device as in claim 25, wherein said analyzing the activity map to determine the threshold value means includes means for analyzing the activity map to determine an image dependent threshold.

27. The digital capture device as in claim 26 further comprising means for creating said activity map means by using either edge detection, local entropy measurement, local texture analysis, local. color/luminance difference analysis.

28. The digital capture device as in claim 26, wherein said activity map means includes means for determining an activity pixel value which activity value is computed as a maximum absolute difference between a value of a predetermined pixel and its neighboring pixel values in the digital image.

29. The digital capture device of claim 26, wherein the image dependent threshold is determined by analyzing a histogram of the activity map.

* * * * *